United States Patent [19]

Sotomura

[11] Patent Number: 5,665,492
[45] Date of Patent: Sep. 9, 1997

[54] COMPOSITE ELECTRODE INCLUDING ORGANIC DISULFIDE COMPOUND, METHOD OF PRODUCING THE SAME, AND LITHIUM SECONDARY BATTERY UTILIZING THE SAME

[75] Inventor: Tadashi Sotomura, Kashiwara, Japan

[73] Assignee: Matsushita Electric Industrial Co., Ltd., Kadoma, Japan

[21] Appl. No.: 589,247

[22] Filed: Jan. 23, 1996

[30] Foreign Application Priority Data

Feb. 8, 1995 [JP] Japan .................. 7-020216
Feb. 17, 1995 [JP] Japan .................. 7-029687

[51] Int. Cl.$^6$ ............... H01M 4/60; H01M 4/66
[52] U.S. Cl. ............... 429/213; 429/245; 427/58
[58] Field of Search .................. 429/213, 245; 427/58, 388.5

[56] References Cited

U.S. PATENT DOCUMENTS

| | | | |
|---|---|---|---|
| 4,717,634 | 1/1988 | Daifuku et al. | 429/213 |
| 4,833,048 | 5/1989 | Dejonghe et al. | 429/104 |
| 4,939,050 | 7/1990 | Toyosawa et al. | 429/241 |
| 5,202,202 | 4/1993 | Nagai et al. | 429/193 |
| 5,324,599 | 6/1994 | Oyama et al. | 429/192 |
| 5,362,493 | 11/1994 | Skotheim et al. | 429/213 X |
| 5,368,959 | 11/1994 | Koksbang et al. | 429/212 |
| 5,413,882 | 5/1995 | Uemachi et al. | 429/213 |
| 5,441,831 | 8/1995 | Okamoto et al. | 429/213 |
| 5,460,905 | 10/1995 | Skotheim | 429/213 |
| 5,462,566 | 10/1995 | Skotheim | 429/213 X |
| 5,518,841 | 5/1996 | Sotomura et al. | 429/213 |

FOREIGN PATENT DOCUMENTS

| | | |
|---|---|---|
| 63-045769 | 2/1988 | Japan. |
| 4-359865 | 12/1992 | Japan. |

*Primary Examiner*—Stephen Kalafut
*Attorney, Agent, or Firm*—Cushman, Darby & Cushman IP Group of Pillsbury Madison & Sutro LLP

[57] ABSTRACT

A composite electrode in which a complex of an organic disulfide compound and polyaniline is supported by a substrate of metallic copper or silver is disclosed. Also, a composite electrode in which a composition including an organic disulfide compound, polyaniline and a metallic powder of copper or silver is supported by a conductive substrate is disclosed.

14 Claims, 3 Drawing Sheets

COMPOSITE ELECTRODE INCLUDING ORGANIC DISULFIDE COMPOUND, METHOD OF PRODUCING THE SAME, AND LITHIUM SECONDARY BATTERY UTILIZING THE SAME

BACKGROUND OF THE INVENTION

1. Field of the Invention

The present invention relates to a composite electrode including an organic disulfide compound that is suitable for use in an electrochemical element such as a battery, an electrochromic display element, a sensor or a memory. The present invention also relates to a method of producing the composite electrode and a lithium secondary battery utilizing the composite electrode as a cathode (positive electrode).

2. Description of the Prior Art

Ever since the discovery of conductive polyacetylene in 1971, various studies have been made on conductive polymer electrodes because the usage of a conductive polymer as an electrode material has been considered suitable for a variety of electrochemical elements such as a light weight battery with a high energy density, an electrochromic element with a large surface area, and a biochemical sensor using a microelectrode. Since polyacetylene is less practical because of its instability, other π-electron-conjugated conductive polymers have been sought for these uses. As a result, comparatively stable polymers such as polyaniline, polypyrrole, polyacene and polythiophene have been found, and a lithium secondary battery using a cathode made of any of these polymers has been developed. Such a battery is estimated to have an energy density of 40 to 80 Wh/kg.

Recently, U.S. Pat. No. 4,833,048 described an organic disulfide compound as an organic material which can attain a further higher energy density. This compound is represented, in its simplest form, by the formula $M^+$—$^-S$—R—$S^-$—$M^+$, wherein R indicates an aliphatic or aromatic organic residue, S indicates a sulfur atom and $M^+$ indicates a proton or metallic cation. Such compounds bind to each other via S—S bonds by electrolytic oxidation, and form a polymer represented by $M^+$—$^-S$—R—S—S—R—S—S—R—$S^-$—$M^+$. The thus formed polymer is regenerated into the original monomer by electrolytic reduction. The aforementioned U.S. Patent discloses a metallic-sulfur secondary battery using a metallic M which supplies and captures cations ($M^+$) in combination with an organic disulfide compound. This battery can realize a very high energy density of 150 Wh/kg or higher, which is comparable to or above the energy density of an ordinary secondary battery.

The use of such an organic disulfide compound in an electrode, however, has a problem that repeated electrolytic oxidation/reduction (i.e., charge/discharge) results in a gradual reduction of the electrode capacity. Oxidation (charge) of the organic disulfide compound generates a polydisulfide compound which is electrically insulating and has a poor ionic conductivity. The polydisulfide compound has low solubility in an electrolyte. In contrast, an organic disulfide monomer which is generated by reducing (discharging) the polydisulfide compound has high solubility in an electrolyte. Therefore, when the oxidation and reduction is repeated, part of the disulfide monomer is dissolved in the electrolyte, and the dissolved monomer is polymerized at a site different from its original position in the electrode. Thus, the polydisulfide compound precipitated away from an electrically-conductive agent such as carbon is isolated from the electron/ion conductive network in the electrode and makes no contribution to the electrode reaction. Repeated oxidation and reduction increases the amount of isolated polydisulfide compound, resulting in a gradual decrease in the capacity of the battery. In addition, the organic disulfide monomer with high solubility tends to move, and hence, it can dissipate from the cathode into the separator or the electrolyte and further toward the anode (negative electrode). As a result, the battery using the organic disulfide compound for its cathode has disadvantageously low charge/discharge efficiency and a short charge-discharge cycle life.

SUMMARY OF THE INVENTION

The present invention was devised to overcome the aforementioned problems. Its object is to provide a composite electrode utilizing an organic disulfide compound which attains high charge/discharge efficiency and an excellent charge-discharge cycle characteristic without losing the characteristic of a high energy density of the organic disulfide compound.

Another object of the present invention is to provide a lithium secondary battery using the composite electrode.

The composite electrode of the present invention utilizes an organic disulfide compound, in which a sulfur-sulfur bond is cleaved by electrolytic reduction to generate a sulfur-metal ion (including proton) bond and the sulfur-metal ion bond is regenerated into the sulfur-sulfur bond by electrolytic oxidation; the composition comprising the organic disulfide compound and polyaniline is supported by a substrate of metallic copper, metallic silver or an alloy containing copper or silver as a main component.

Alternatively, in the composite electrode of the present invention, the composition comprising the organic disulfide compound, polyaniline, and a metal powder of copper, silver or an alloy containing copper or silver as a main component is supported by an electrically-conductive substrate.

The present invention further provides a method of producing the composite electrode comprising:

(1) a first step of dissolving an organic disulfide compound which contains at least one sulfur-sulfur bond in 2-pyrrolidone or N-alkyl-2-pyrrolidone to form a solution, the sulfur-sulfur bond being cleaved when electrolytically reduced to form a sulfur-metal ion (including proton) bond and the sulfur-metal ion bond is regenerated into the sulfur-sulfur bond when electrolytically oxidized, (2) a second step of adding polyaniline to the solution to dissolve the polyaniline, thereby obtaining a homogeneous liquid, (3) a third step of applying the homogeneous liquid on a substrate made of metallic copper, metallic silver or an alloy including copper or silver as a main component to form a layer, and (4) a fourth step of heating the substrate with the layer in a vacuum or in an inert gas atmosphere to obtain on the substrate a solid composition wherein the organic disulfide compound and the polyaniline are homogeneously mixed.

Alternatively, the method of producing the composite electrode comprises:

(1) a first step of dissolving an organic disulfide compound which contains at least one sulfur-sulfur bond in 2-pyrrolidone or N-alkyl-2-pyrrolidone to form a solution, the sulfur-sulfur bond being cleaved when electrolytically reduced to form a sulfur-metal ion (including proton) bond and the sulfur-metal ion bond is regenerated into the sulfur-sulfur bond when electrolytically oxidized, (2) a second step of adding a metallic powder of copper, silver or an alloy containing copper or silver as a main component and polyaniline to the solution to disperse the powder and to dissolve the polyaniline, thereby obtaining a mixture wherein the metal powder is dispersed and the polyaniline is dissolved in the solution, (3) a third step of applying the mixture on an electrically-conductive substrate to form a layer, and (4) a fourth step of heating the substrate with the layer in a vacuum or in an inert gas atmosphere to obtain on the substrate a solid composition wherein the organic disulfide compound, the polyaniline, and the metal powder are homogeneously mixed.

In one aspect of the present invention, the second step comprises a step of adding a metal powder of copper, silver or an alloy containing copper or silver as a main component to the solution obtained in the first step and a step of further adding polyaniline to the solution.

Furthermore, the present invention provides a lithium secondary battery comprising the aforementioned composite electrode using the organic disulfide compound as a cathode, a non-aqueous electrolyte and an anode using lithium as an active material.

DESCRIPTION OF THE PREFERRED EMBODIMENTS

Figure 1:
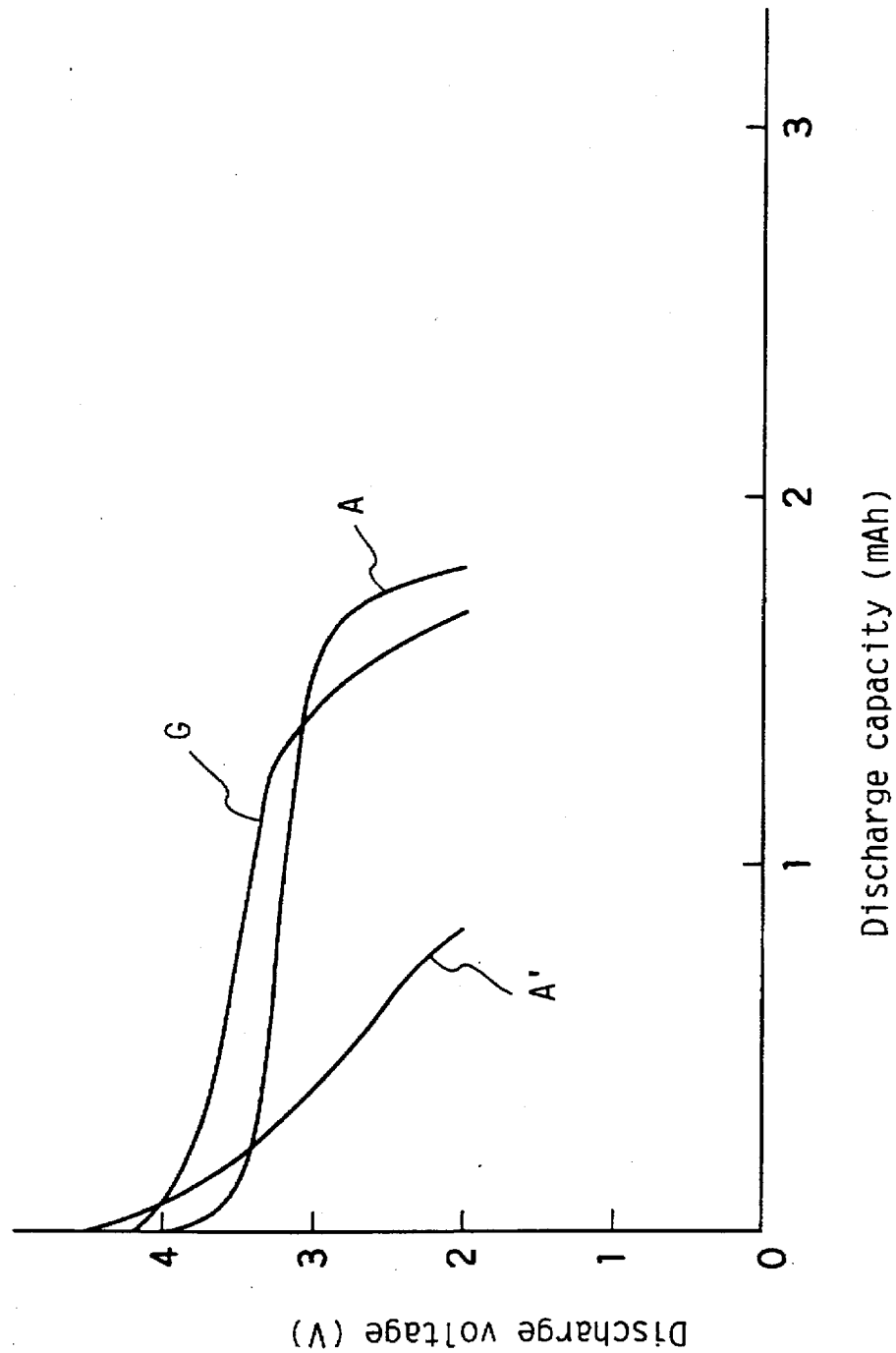
FIG. 1 is a graph showing the discharge voltages of lithium secondary batteries respectively including, as a cathode, a composite electrode A of Example 1, a composite electrode G of Example 7 and a composite electrode A' of Comparative Example 1.

The present invention provides a composite electrode whose capacity is less decreased through repeated oxidation and reduction. A secondary battery using this composite electrode as a cathode can attain less decrease in capacity through the repeated charge/discharge as well as a high energy density because dissipation of an active material from the cathode is suppressed during the charge/discharge. In addition, the battery can provide a flat discharge voltage.

The following examples are limited to batteries comprising electrode compositions. When the composite electrode of the present invention is used as a counter electrode, it is also possible to construct an electrochromic element with a high coloring/fading speed or a biochemical sensor such as a glucose sensor with a high response speed. The composite electrode of the present invention is also applicable to an electrochemical analog memory with a high writing/reading speed.

Metallic copper or metallic silver, which is one of the components of the composite electrode, forms a complex together with polyaniline and an organic disulfide compound by charging/discharging reaction. Formation of the complex prevents the complex of the organic disulfide compound and polyaniline from dissolving in an electrolyte to dissipate from the cathode. This ensures an excellent charge-discharge cycle characteristic. In addition, the composite electrode of the present invention provides a flat voltage as compared with a conventional composite electrode comprising merely polyaniline and an organic disulfide compound. The present inventor considers that such functions are realized as follows:

In a battery comprising the composite electrode as a cathode, metallic lithium as an anode and an aprotic organic solvent including lithium salt as an electrolyte, when the cathode is charged at a constant current, metallic copper or metallic silver, which has a deposition voltage against metallic lithium around 3.2 to 3.4 V, is dissolved as copper cations or silver cations. Accompanied with the dissolving reaction, the organic disulfide compound forming the complex through N-S bonds between S atoms of the organic disulfide compound and N atoms of polyaniline is oxidized, so that the organic disulfide compound is polymerized to generate polydisulfide. When the battery is discharged, the polydisulfide forming the complex through N-S bonds at N position of polyaniline is changed into disulfide monomer anions, which form counter ions or a copper or silver complex together with copper cations or silver cations generated through the charge. This prevents the disulfide monomer from dispersing into the electrolyte and dissipating from the cathode. Furthermore, S atoms of the organic disulfide compound excluding those bonded to the N atoms of polyaniline form counter ions or a copper or silver complex together with the copper cations or the silver cations. As a result, polyaniline, the organic disulfide compound and copper or silver are molecularly bounded to one another to form a high-order structure in the cathode. This also prevents the complex from dissolving and dispersing in the electrolyte. The formation of the counter ions or the copper or silver complex also prevents the copper or silver cations from dispersing in the electrolyte. Thus, the copper or silver cations are prevented from reaching the anode and reacting with the metallic lithium therein, which otherwise causes self discharge.

Furthermore, since the counter ions or the copper or silver complex can work as a species of the battery reaction, this battery can provide a flat voltage as compared with a conventional composite electrode comprising merely polyaniline and an organic disulfide compound.

According to the method of producing the composite electrode of the present invention, polyaniline, which increases the viscosity of a solution, is added to the electrode composition after dissolving the organic disulfide compound in 2-pyrrolidone or N-alkyl-2-pyrrolidone. Therefore, it is possible to obtain a solution in which the organic disulfide compound and polyaniline are homogeneously dissolved in 2-pyrrolidone or N-alkyl-2-pyrrolidone at a high concentration. When polyaniline is added after addition of metallic copper or silver powder, the organic disulfide compound and polyaniline can be homogeneously dissolved in 2-pyrrolidone or N-alkyl-2-pyrrolidone at a high concentration and the metallic copper or silver powder can be homogeneously dispersed therein. The thus obtained solution is applied on a substrate to produce a uniform composite electrode film with a high density and no pin holes. Furthermore, since the complex of the disulfide compound and polyaniline is chemically tightly adhered to the substrate of metallic copper or silver or to the copper or silver powder via the counter ions or the copper or silver complex, the resultant electrode can attain a stable charge/discharge characteristic.

The disulfide compound used in the present invention can be a compound represented by the formula $(R(S)_y)_n$, wherein R indicates an aliphatic or aromatic group, S indicates a sulfur atom, y is an integer of 1 or more, and n is an integer of 2 or more, which is described in U.S. Pat. No. 4,833,048. Specific examples of the disulfide compound include dithioglycol represented by $HSCH_2CH_2SH$, 2,5-dimercapto-1,3,4-thiadiazole represented by $C_2N_2S(SH)_2$, s-triazine-2,4,6-trithiol represented by $C_3H_3N_3S_3$, 7-methyl-2,6,8-trimercaptopurine represented by $C_6H_6N_4S_3$, and 4,5-diamino-2,6-dimercaptopyrimidine represented by $C_4H_6N_4S_2$. Any of commercially available products of these compounds can be used without any treatment. Alternatively, it is possible to use any of polymers including a dimer and a tetramer of an organic disulfide compound obtained by polymerizing any of the above-described organic disulfide compounds by electrolytic oxidation or chemical polymerization which uses an oxidizing agent such as iodine, potassium ferricyanide and hydrogen peroxide.

Polyaniline used in the present invention is obtained by chemical polymerization or electrolytic polymerization of aniline or its derivative. In particular, polyaniline in a reduced and undoped form is preferred because it can effectively capture an organic disulfide monomer. The reduction degree index (RDI) of polyaniline is expressed by using the UV-light absorption spectrum of a solution in which a small amount of polyaniline is dissolved in N-methyl-2-pyrrolidone. Specifically, RDI is represented by $RDI = I_{640}/I_{340}$, wherein $I_{340}$ indicates the intensity of an absorption peak derived from a para substituted benzene structure appearing on the shorter wavelength side around 340 nm, and $I_{640}$ indicates the intensity of an absorption peak derived from a quinonediimine structure appearing on the longer wavelength side around 640 nm. Polyaniline with an RDI value of 0.5 or less is preferably used. The degree of undoping of polyaniline is indicated by conductivity. Polyaniline with a conductivity of $10^{-5}$ S/cm or less is preferably used.

N-alkyl-2-pyrrolidone used in the production method of the present invention can be a commercially available reagent or a reagent whose water content is decreased to 20 ppm or less by using a zeolite adsorbent. Examples include 2-pyrrolidone, N-methyl-2-pyrrolidone, N-ethyl-2-pyrrolidone and N-butyl-2-pyrrolidone.

The metallic copper or silver used in the present invention can be pure copper or pure silver, or a copper or silver alloy containing copper or silver as a main component. The electrode substrate formed from the metal is preferably a sheet or a foil with a thickness of from 0.1 μm to 100 μm. The sheet or foil used as the substrate can have a flat or uneven surface, and can also have a plurality of regular or irregular holes. Other examples of the substrate include a clad metal obtained by laminating a copper or silver foil on a metal foil of titanium, aluminum, stainless steel or the like, and a metal foil of titanium, aluminum, stainless steel or the like plated with copper or silver.

The metallic copper or silver powder to be mixed with the organic disulfide compound and polyaniline can be similarly powder of an alloy containing copper or silver as a main component. When the metal is in the shape of powder or fiber, the particle size, the diameter of the fiber and the length of the fiber are preferably 100 angstrom to 10 μm. Alternatively, it is possible to use particles of a synthetic resin such as an acrylic resin coated with copper or a copper alloy.

The metal included in the substrate or the powder has substantially the same potential as that of metal copper or silver.

The mixing ratio of polyaniline to the organic disulfide compound is preferably 0.01 to 10 parts by weight of polyaniline per 1 part by weight of the organic disulfide compound. The mixing ratio of the metallic copper or silver powder is preferably 0.01 to 10 parts by weight per 1 part by weight of the mixture of the organic disulfide compound and polyaniline.

Examples of the conductive substrate used in the production method of the present invention include a porous carbon film made of carbon black and a polyfluorocarbon resin, a metal foil of titanium, aluminum, stainless steel or the like, a conductive polymer film made of polyaniline, polypyrrole or the like, and a metal foil or a carbon film coated or covered with a conductive polymer film.

The metal cation $M^+$ used in forming a salt by reducing the organic disulfide compound can be an alkaline metal cation and an alkaline earth metal cation described in the aforementioned U.S. Patent, as well as a copper cation and a silver cation.

The composite electrode of the present invention can further comprise an electrically-conductive agent to further increase its conductivity. Examples of the electrically-conductive agent include carbon powder or fiber such as graphite powder, graphite fiber and acetylene black powder, and a conductive polymer excluding polyaniline such as polypyrrole and polythiophene. In particular, polypyrrole represented by the following formula 1, which is soluble in 2-pyrrolidone or N-alkyl-2-pyrrolidone used in the production method of the present invention, is preferred because it improves the filming property of the composite electrode and attains excellent conductivity.

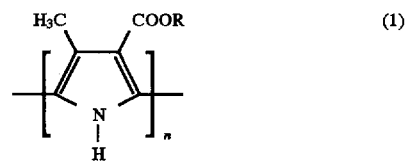

wherein R indicates an alkyl group and n is a number indicating the degree of polymerization; for example, when $R = C_4H_9$, $C_2H_5$, $C_4H_9:C_2H_5 = 1:2$, then n=200 to 1,000.

The composite electrode of the present invention can further comprise an electrolyte including the metal cation $M^+$. Such an electrolyte is preferably a solid or semi-solid polymer electrolyte in which the organic disulfide monomer is unlikely to disperse. Effective usable examples include a polymer solid electrolyte in which a lithium salt such as $LiClO_4$, $LiCF_3SO_3$ and $LiN(CF_3SO_2)_2$ is dissolved in polyethylene oxide, and a semi-solid polymer electrolyte obtained by gelatinizing, by using a polymer such as polyacrylonitrile, polyvinylidene fluoride or polyacrylic acid, an electrolyte solution in which a lithium salt such as $LiClO_4$, $LiCF_3SO_3$, $LiBF_4$, $LiPF_6$, $LiN(CF_3SO_2)_2$ is dissolved in a non-aqueous solvent such as propylene carbonate and ethylene carbonate. It is also possible to add a liquid electrolyte in which the lithium salt of N-alkyl-2-pyrrolidone is dissolved so as to attain a concentration of approximately 1M.

The composite electrode of the present invention can further comprise an organic polymer binder such as polyvinyl pyrrolidone, polyvinyl alcohol and polyvinyl pyridine, to improve the filming property to achieve a high film strength.

The present invention may be further understood by reference to the following non-limiting examples and comparative examples.

EXAMPLE 1

First, 2.0 g of powder of 2,5-dimercapto-1,3,4-thiadiazole (hereinafter referred to as "DMcT") was dissolved in 7.0 g of N-methyl-2-pyrrolidone (hereinafter referred to as "NMP"). To the resultant solution added was 1.0 g of powder of undoped reduced polyaniline with a conductivity of $10^{-8}$ S/cm and an RDI value of 0.26, which was obtained by undoping polyaniline ("ANILEAD" available from Nitto Denko Corp., Japan) in an alkaline solution and reducing the resultant with hydrazine, to give a viscous DMcT-polyaniline (hereinafter referred to as "PAn")-NMP solution with a color of greenish blue. The solution was applied on a metallic copper foil with a thickness of 10 µm by using an applicator with a coating gap of 150 µm. The resultant foil was heated at a temperature of 80° C. for 15 minutes in an argon gas stream, and was further heated in a vacuum at a temperature of 80° C. for 60 minutes, thereby producing a composite electrode with a thickness of 35 µm. The composite electrode was cut into a square of 2×2 cm, which was designated as a composite electrode A.

EXAMPLE 2

First, 2.0 g of DMcT powder was dissolved in 7.0 g of NMP. Then, to the resultant solution added was 1.0 g of powder of undoped reduced polyaniline with a conductivity of $10^{-8}$ S/cm and an RDI value of 0.30, which was obtained by undoping polyaniline ("ANILEAD" available from Nitto Denko Corp., Japan) in an alkaline solution and reducing the resultant with hydrazine. To the obtained mixture further added was 9.7 g of NMP to give a DMcT-PAn-NMP solution with a color of greenish blue. To the DMcT-PAn-NMP solution added was a solution obtained by adding 0.5 g of the soluble polypyrrole (hereinafter referred to as "PPy") represented by the above-mentioned formula (1) to give a viscous DMcT-PAn-PPy-NMP solution. Then, 1.0 g of acetylene black powder was added to and homogeneously dispersed in the DMcT-PAn-PPy-NMP solution to give black ink. The black ink was applied on a metallic copper foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 55 µm. The composite electrode was cut into a square of 2×2 cm, which was designated as a composite electrode B.

EXAMPLE 3

First, 2.0 g of DMcT powder was dissolved in 7.0 g of NMP. Then, to the resultant solution added was 1.0 g of powder of undoped reduced polyaniline with a conductivity of $10^{-8}$ S/cm and an RDI value of 0.25, which was obtained by undoping polyaniline ("ANILEAD" available from Nitto Denko Corp., Japan) in an alkaline solution and reducing the resultant with hydrazine. To the obtained mixture further added was 9.7 g of NMP to give a DMcT-PAn-NMP solution with a color of greenish blue. To the DMcT-PAn-NMP solution added was a solution obtained by dissolving 0.5 g of polyvinyl pyrrolidone (hereinafter referred to as "PVP") with an average molecular weight of 25,000 in 5.0 g of NMP to give a viscous DMcT-PAn-PVP-NMP solution. Then, 1.0 g of acetylene black powder was added to and homogeneously dispersed in the DMcT-PAn-PVP-NMP solution to give black ink. The black ink was applied on a metallic copper foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 55 µm. The composite electrode was cut into a square of 2×2 cm, which was designated as a composite electrode C.

EXAMPLE 4

First, 1.5 g of powder of s-triazine-2,4,6-trithiol (hereinafter referred to as "TTA") was dissolved in 7.0 g of NMP. Then, to the resultant solution added was 1.0 g of powder of undoped reduced polyaniline with a conductivity of $10^{-8}$ S/cm and an RDI value of 0.18, which was obtained by undoping polyaniline ("ANILEAD" available from Nitto Denko Corp., Japan) in an alkaline solution and reducing the resultant with hydrazine. To the obtained mixture further added was 9.7 g of NMP to give a TTA-PAn-NMP solution with a color of greenish blue. To the TTA-PAn-NMP solution added was a solution obtained by dissolving 0.5 g of the soluble polypyrrole represented by the formula (1) in 5.0 g of NMP, to give a viscous TTA-PAn-PPy-NMP solution. Then, 1.0 g of acetylene black powder was added to and homogeneously dispersed in the TTA-PAn-PPy-NMP solution to give black ink. The black ink was applied on a metallic copper foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 58 µm. The composite electrode was cut into a square of 2×2 cm, which was designated as a composite electrode D.

EXAMPLE 5

First, 2.0 g of DMcT powder was dissolved in 7.0 g of NMP. To the resultant solution added was 0.5 g of metallic copper powder with an average particle size of 1 µm to give reddish ink. To the ink added was 1.0 g of powder of undoped reduced polyaniline with a conductivity of $10^{-8}$ S/cm and an RDI value of 0.28, which was obtained by undoping polyaniline ("ANILEAD" available from Nitto Denko Corp., Japan) and reducing the resultant with hydrazine. The thus obtained ink was applied on a titanium foil with a thickness of 10 µm by using an applicator with a coating gap of 150 µm. The resultant foil was heated at a temperature of 80° C. for 15 minutes in an argon gas stream and further heated under reduced pressure of 1 cmHg at a temperature of 80° C. for 60 minutes, thereby producing a composite electrode with a thickness of 35 µm. This electrode was cut into a square of 2×2 cm, which was designated as a composite electrode E.

EXAMPLE 6

First, 2.0 g of DMcT powder was dissolved in 7.0 g of NMP. To the resultant solution further added was 9.7 g of NMP to give a DMcT-NMP solution with a color of greenish blue. To the DMcT-NMP solution added were 0.5 g of acetylene black powder and 0.5 g of metallic copper powder with an average particle size of 1 µm to be homogeneously dispersed. In the thus obtained solution dissolved was 1.0 g of powder of undoped reduced polyaniline with a conductivity of $10^{-8}$ S/cm and an RDI value of 0.25, which was obtained by undoping polyaniline ("ANILEAD" available from Nitto Denko Corp., Japan) in an alkaline solution and reducing the resultant with hydrazine. To the resultant solution further added was a solution obtained by dissolving 0.5 g of polyvinyl pyrrolidone with an average molecular weight of 25,000 in 2.5 g of NMP to give black ink. The black ink was applied on a titanium foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 50 µm. This electrode was cut into a square of 2×2 cm, which was designated as a composite electrode F.

EXAMPLE 7

First, 2.0 g of DMcT powder was dissolved in 7.0 g of NMP. To the resultant solution added was 1.0 g of powder of undoped reduced polyaniline with a conductivity of $10^{-8}$ S/cm and an RDI value of 0.26, which was obtained by undoping polyaniline ("ANILEAD" available from Nitto Denko Corp., Japan) in an alkaline solution and reducing the resultant with hydrazine, to give a viscous DMcT-PAn-NMP solution with a color of Greenish blue. The DMcT-PAn-NMP solution was applied on a metallic silver foil with a thickness of 10 µm by using an applicator with a coating gap of 150 µm. The resultant foil was heated at a temperature of 80° C. for 15 minutes in an argon stream and further heated in a vacuum at a temperature of 80° C. for 60 minutes, thereby producing a composite electrode with a thickness of 35 µm. This composite electrode was cut into a square of 2×2 cm, which was designated as a composite electrode G.

EXAMPLE 8

First, 2.0 g of DMcT powder was dissolved in 7.0 g of NMP. Then, to the resultant solution added was 1.0 g of powder of undoped reduced polyaniline with a conductivity of $10^{-8}$ S/cm and an RDI value of 0.30, which was obtained by undoping polyaniline ("ANILEAD" available from Nitto Denko Corp., Japan) in an alkaline solution and reducing the resultant with hydrazine, to be homogeneously dissolved. To the obtained mixture further added was 9.7 g of NMP to give a DMcT-PAn-NMP solution with a color of greenish blue. To the DMcT-PAn-NMP solution added was a solution obtained by dissolving 0.5 g of the soluble polypyrrole represented by the formula (1) in 5.0 g of NMP to give a viscous DMcT-PAn-PPy-NMP solution. Then, 1.0 g of acetylene black powder was added to and homogeneously dispersed in the DMcT-PAn-PPy-NMP solution to give black ink. The black ink was applied on a metallic silver foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 55 µm. The composite electrode was cut into a square of 2×2 cm, which was designated as a composite electrode H.

EXAMPLE 9

First, 2.0 g of DMcT powder was dissolved in 7.0 g of NMP. Then, to the resultant solution added was 1.0 g of powder of undoped reduced polyaniline with a conductivity of $10^{-8}$ S/cm and an RDI value of 0.25, which was obtained by undoping polyaniline ("ANILEAD" available from Nitto Denko Corp., Japan) in an alkaline solution and reducing the resultant with hydrazine, to be homogeneously dissolved. To the obtained mixture further added was 9.7 g of NMP to give a DMcT-PAn-NMP solution with a color of greenish blue. To the DMcT-PAn-NMP solution added was a solution obtained by dissolving 0.5 g of polyvinyl pyrrolidone with an average molecular weight of 25,000 in 5.0 g of NMP to give a viscous DMcT-PAn-PVP-NMP solution. Then, 1.0 g of acetylene black powder was added to and homogeneously dispersed in the DMcT-PAn-PVP-NMP solution to give black ink. The black ink was applied on a metallic silver foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 55 µm. The composite electrode was cut into a square of 2×2 cm, which was designated as a composite electrode I.

EXAMPLE 10

First, 1.5 g of TTA powder was dissolved in 7.0 g of NMP. Then, to the resultant solution added was 1.0 g of powder of undoped reduced polyaniline with a conductivity of $10^{-8}$ S/cm and an RDI value of 0.18, which was obtained by undoping polyaniline ("ANILEAD" available from Nitto Denko Corp., Japan) in an alkaline solution and reducing the resultant with hydrazine, to be homogeneously dissolved. To the obtained mixture further added was 9.7 g of NMP to give a TTA-PAn-NMP solution with a color of greenish blue. To the TTA-PAn-NMP solution added was a solution obtained by dissolving 0.5 g of the soluble polypyrrole represented by the formula (1) in 5.0 g of NMP to give a viscous TTA-PAn-PPy-NMP solution. Then, 1.0 g of acetylene black powder was added to and homogeneously dispersed in the TTA-PAn-PPy-NMP solution to give black ink. The black ink was applied on a metallic silver foil with a thickness of 30 µm by using an applicator with a coating gap of 250 µm. The resultant foil was heated at a temperature of 80° C. for 15 minutes in an argon gas stream and further heated in a vacuum at a temperature of 80° C. for 60 minutes, thereby producing a composite electrode with a thickness of 58 µm. The composite electrode was cut into a square of 2×2 cm, which was designated as a composite electrode J.

EXAMPLE 11

First, 2.0 g of DMcT powder was dissolved in 7.0 g of NMP. To the resultant solution added was 0.5 g of metallic silver powder with an average particle size of 1 µm. To the thus obtained solution added was 1.0 g of powder of undoped reduced polyaniline with a conductivity of $10^{-8}$ S/cm and an RDI value of 0.28, which was obtained by undoping polyaniline ("ANILEAD" available from Nitto Denko Corp., Japan) in an alkaline solution and reducing the resultant with hydrazine, to give ink. The ink was applied on a titanium foil with a thickness of 10 µm by using an applicator with a coating gap of 150 µm. The resultant foil was heated at a temperature of 80° C. for 15 minutes, and further heated under reduced pressure of 1 cmHg at a temperature of 80° C. for 60 minutes, thereby producing a composite electrode with a thickness of 35 µm. This electrode was cut into a square of 2×2 cm, which was designated as a composite electrode K.

EXAMPLE 12

First, 2.0 g of DMcT powder was dissolved in 7.0 g of NMP. To the resultant solution further added was 9.7 g of NMP to give a DMcT-NMP solution with a color of greenish blue. To the DMcT-NMP solution added were 0.5 g of acetylene black powder and 0.5 g of metallic silver powder with an average particle size of 1 μm to be homogeneously dispersed. To the thus obtained mixture added was 1.0 g of powder of undoped reduced polyaniline with a conductivity of $10^{-8}$ S/cm and an RDI value of 0.25, which was obtained by undoping polyaniline ("ANILEAD" available from Nitto Denko Corp., Japan) in an alkaline solution and reducing the resultant with hydrazine. To the resultant solution further added was a solution obtained by dissolving 0.5 g of polyvinyl pyrrolidone with an average molecular weight of 25,000 in 2.5 g of NMP to give black ink. The black ink was applied on a titanium foil with a thickness of 30 μm by using an applicator with a coating gap of 250 μm. The resultant foil was heated at a temperature of 80° C. for 15 minutes in an argon gas stream and further heated in a vacuum at a temperature of 80° C. for 60 minutes, thereby producing a composite electrode with a thickness of 50 μm. This electrode was cut into a square of 2×2 cm, which was designated as a composite electrode L.

Comparative Example 1

A composite electrode A' with a thickness of 35 μm was produced in the same manner as in Example 1 except that the metallic copper foil was replaced with a titanium foil with a thickness of 10 μm.

Comparative Example 2

A composite electrode B' with a thickness of 55 μm was produced in the same manner as in Example 2 except that the metallic copper foil was replaced with a titanium foil with a thickness of 30 μm.

Comparative Example 3

A composite electrode C' with a thickness of 55 μm was produced in the same manner as in Example 3 except that the metallic copper foil was replaced with a titanium foil with a thickness of 30 μm.

Comparative Example 4

A composite electrode D' with a thickness of 58 μm was produced in the same manner as in Example 4 except that the metallic copper foil was replaced with a titanium foil with a thickness of 30 μm.

Comparative Example 5

A composite electrode E' with a thickness of 35 μm was produced in the same manner as in Example 5 except that no metallic copper powder was added to the DMcT-PAn-NMP solution.

Comparative Example 6

A composite electrode F' with a thickness of 50 μm was produced in the same manner as in Example 6 except that no metallic copper powder was added to the DMcT-PAn-PVP-NMP solution.

Evaluation of the Performance of the Electrodes

The composite electrodes A through L and A' through F' were used as cathodes to manufacture flat batteries A through L and A' through F', respectively, each of which uses metallic lithium with a thickness of 0.3 mm as an anode and a gel electrolyte with a thickness of 0.6 mm as a separator layer. The gel electrolyte was obtained by gelatinizing 20.7 g of a 1M propylene carbonate/ethylene carbonate (volume ratio: 1:1) of $LiBF_4$ with 3.0 g of polyacrylonitrile.

Figure 2:
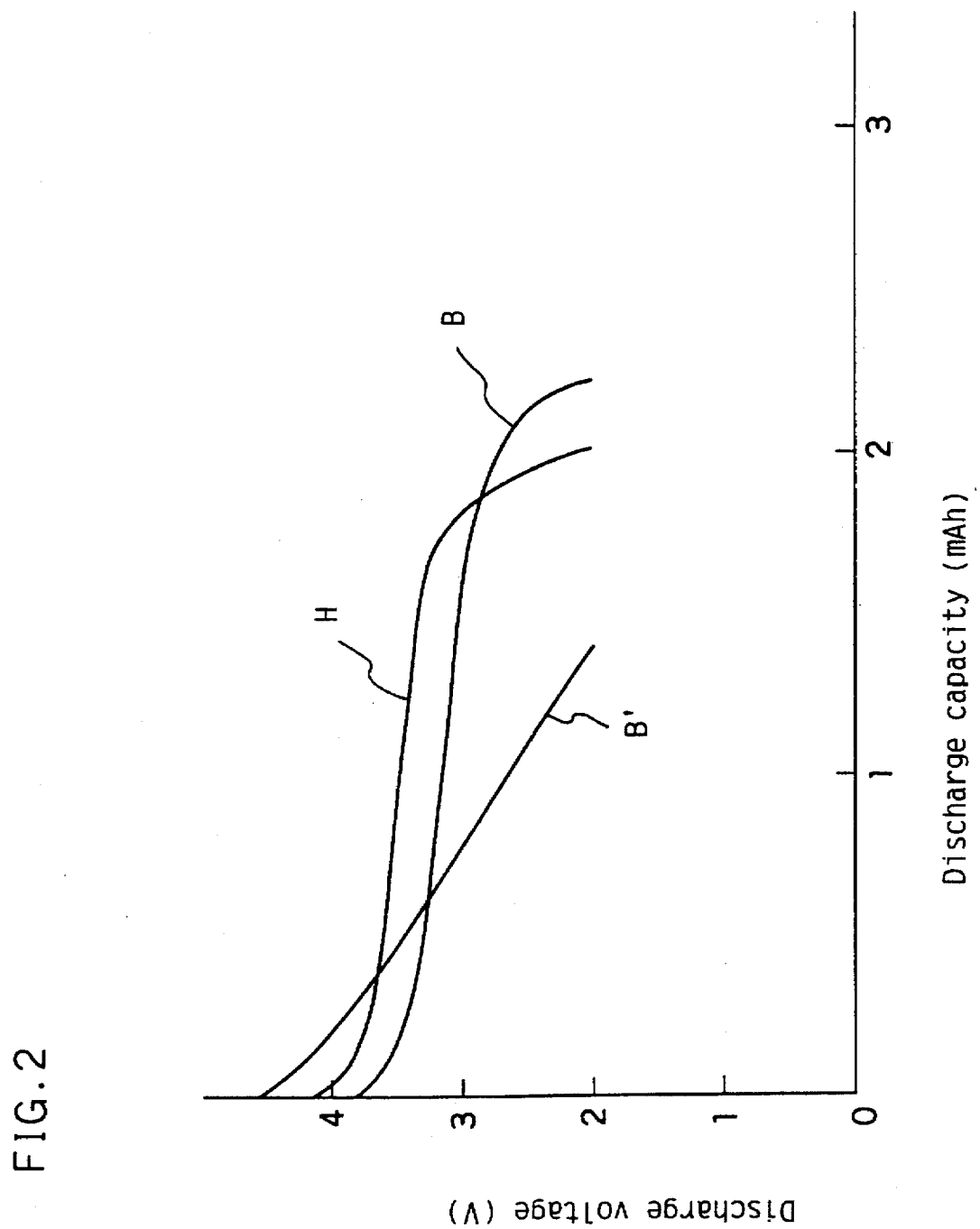
FIG. 2 is a graph showing the discharge voltages of lithium secondary batteries respectively including, as a cathode, a composite electrode B of Example 2, a composite electrode H of Example 8 and a composite electrode B' of Comparative Example 2.
Figure 3:
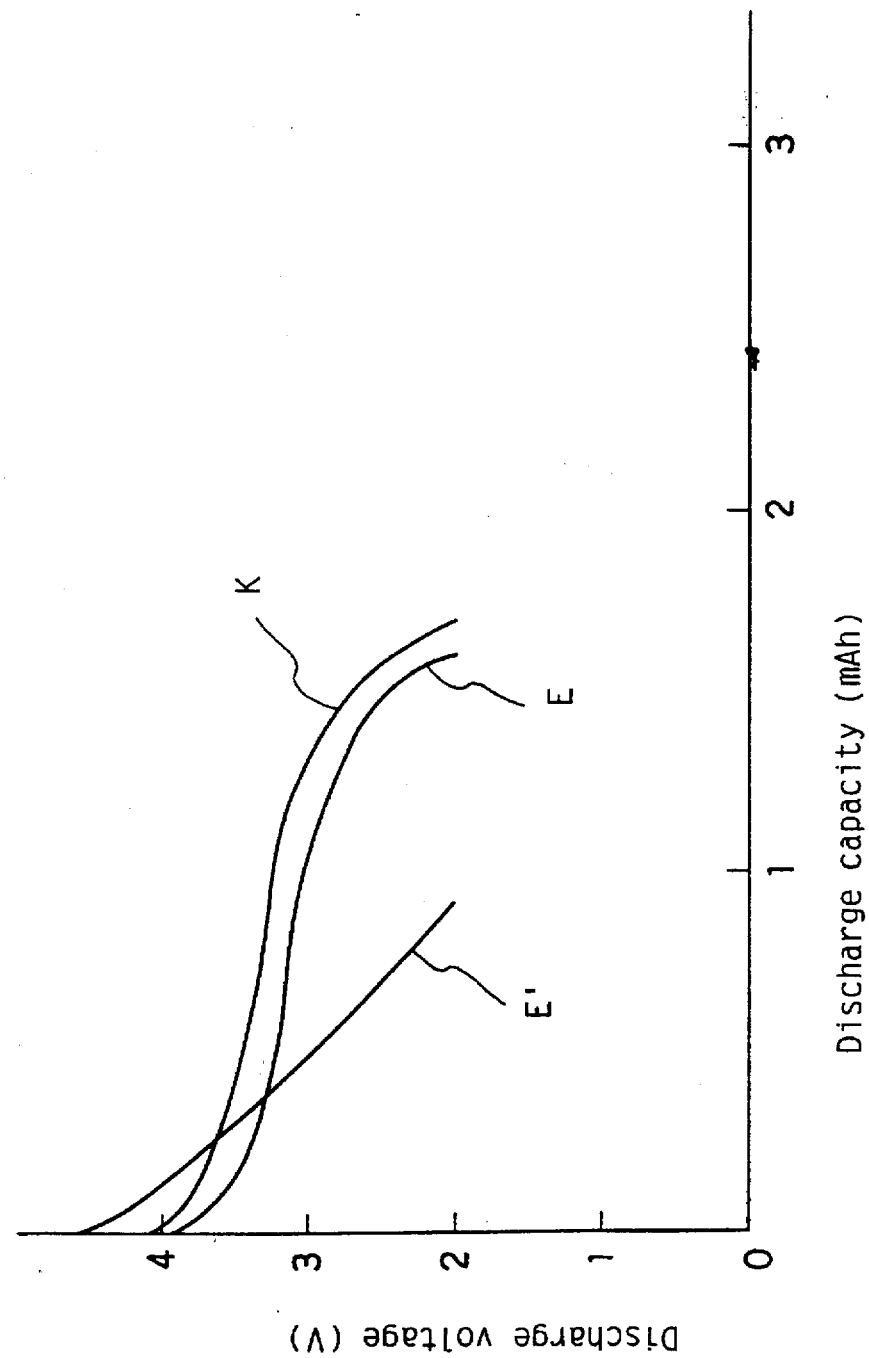
FIG. 3 is a graph showing the discharge voltages of lithium secondary batteries respectively including, as a cathode, a composite electrode E of Example 5, a composite electrode K of Example 11 and a composite electrode E' of Comparative Example 5.

Each of the batteries was evaluated for its charge-discharge cycle characteristic as follows:

The battery was repeatedly charged and discharged at a temperature of 20° C. at a constant current of 0.2 mA in a voltage range of 4.65 to 2.0 V. The discharge capacity Q (unit: mAh) at each charge and discharge cycle was measured. The results are listed in Table 1 below. In addition, FIG. 1 through FIG. 3 show the discharge capacities at the fifth cycle of the batteries A, G and A', the batteries B, H, and B' and the batteries E, K and E', respectively.

TABLE 1

| Battery | Discharge capacity (unit: mAh) Charge/dishcarge cycle | | | |
|---|---|---|---|---|
| | 1 | 5 | 30 | 50 |
| A | 1.8 | 1.8 | 1.5 | 1.3 |
| B | 2.0 | 2.2 | 2.2 | 2.1 |
| C | 2.3 | 2.0 | 1.8 | 1.6 |
| D | 2.6 | 2.6 | 2.4 | 2.1 |
| E | 1.8 | 1.6 | 1.3 | 1.1 |
| F | 2.0 | 1.7 | 1.5 | 1.2 |
| G | 1.6 | 1.7 | 1.5 | 1.2 |
| H | 1.8 | 2.0 | 1.9 | 1.7 |
| I | 2.1 | 2.0 | 1.7 | 1.5 |
| J | 2.4 | 2.3 | 2.1 | 1.9 |
| K | 1.9 | 1.7 | 1.3 | 1.2 |
| L | 2.1 | 1.6 | 1.4 | 1.2 |
| A' | 1.2 | 0.8 | 0.4 | 0.3 |
| B' | 1.8 | 1.4 | 1.0 | 0.8 |
| C' | 1.9 | 1.2 | 0.8 | 0.6 |
| D' | 2.2 | 1.6 | 1.2 | 0.7 |
| E' | 1.2 | 0.9 | 0.5 | 0.3 |
| F' | 1.6 | 1.2 | 0.8 | 0.5 |

As is apparent from the results, in the batteries using the composite electrodes A through L of Examples 1 through 12 in accordance with the present invention, the discharge capacity is less decreased during the charge-discharge cycles as compared with that in the batteries using the composite electrodes A' through F' of Comparative Examples 1 through 6. Furthermore, the batteries using the composite electrodes in accordance with the present invention provide a comparatively flat voltage ranging between 3.5 V and 2.5 V as compared with batteries using the composite electrodes of Comparative Examples.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as falling within the true spirit and scope of the invention.

What is claimed is:

1. A composite electrode comprising:
   (a) a substrate made of metallic copper, metallic silver or an alloy including copper or silver as a main component, and
   (b) a composition supported on said substrate, said composition comprising polyaniline and an organic disulfide compound which contains at least one sulfur-sulfur bond, wherein said sulfur-sulfur bond is cleaved when electrolytically reduced to form a sulfur-metal ion (including proton) bond and said sulfur-metal ion bond is regenerated into said sulfur-sulfur bond when electrolytically oxidized.

2. A composite electrode comprising:
(a) an electrically-conductive substrate, and
(b) a composition supported on said substrate, said composition comprising polyaniline, a metallic powder of copper, silver or an alloy containing copper or silver as a main component, and an organic disulfide compound which contains at least one sulfur-sulfur bond, wherein said sulfur-sulfur bond is cleaved when electrolytically reduced to form a sulfur-metal ion (including proton) bond and said sulfur-metal ion bond is regenerated into said sulfur-sulfur bond when electrolytically oxidized.

3. A method of producing a composite electrode comprising:
(1) a first step of dissolving an organic disulfide compound which contains at least one sulfur-sulfur bond in 2-pyrrolidone or N-alkyl-2-pyrrolidone to form a solution, said sulfur-sulfur bond being cleaved when electrolytically reduced to form a sulfur-metal ion (including proton) bond and said sulfur-metal ion bond is regenerated into said sulfur-sulfur bond when electrolytically oxidized, (2) a second step of adding polyaniline to said solution to dissolve said polyaniline, thereby obtaining a homogeneous liquid, (3) a third step of applying said homogeneous liquid on a substrate made of metallic copper, metallic silver or an alloy including copper or silver as a main component to form a layer, and (4) a fourth step of heating said substrate with said layer in a vacuum or in an inert gas atmosphere to obtain on said substrate a solid composition wherein said organic disulfide compound and said polyaniline are homogeneously mixed.

4. A method of producing a composite electrode comprising:
(1) a first step of dissolving an organic disulfide compound which contains at least one sulfur-sulfur bond in 2-pyrrolidone or N-alkyl-2-pyrrolidone to form a solution, said sulfur-sulfur bond being cleaved when electrolytically reduced to form a sulfur-metal ion (including proton) bond and said sulfur-metal ion bond is regenerated into said sulfur-sulfur bond when electrolytically oxidized, (2) a second step of adding a metallic powder of copper, silver or an alloy containing copper or silver as a main component and polyaniline to said solution to disperse said metallic powder and to dissolve said polyaniline, thereby obtaining a mixture wherein said metallic powder is dispersed and said polyaniline is dissolved in said solution, (3) a third step of applying said mixture on an electrically-conductive substrate to form a layer, and (4) a fourth step of heating said substrate with said layer in a vacuum or in an inert gas atmosphere to obtain on said substrate a solid composition wherein said organic disulfide compound, said polyaniline, and said metallic powder are homogeneously mixed.

5. A method of producing a composite electrode in accordance with claim 4, wherein said second step comprises a step of adding said metallic powder to said solution and then adding said polyaniline to the resultant mixture.

6. A lithium secondary battery comprising a cathode composed of the composite electrode in accordance with claim 1, a non-aqueous electrolyte, and an anode.

7. A lithium secondary battery comprising a cathode composed of the composite electrode in accordance with claim 2, a non-aqueous electrolyte, and an anode.

8. A composite electrode according to claim 1, wherein said substrate includes metallic silver.

9. A composite electrode according to claim 2, wherein said metallic powder includes metallic silver.

10. A method according to claim 3, wherein said substrate includes metallic silver.

11. A method according to claim 4, wherein said metallic powder includes metallic silver.

12. A method according to claim 5, wherein said metallic powder includes metallic silver.

13. A lithium secondary battery according to claim 6, wherein said substrate includes metallic silver.

14. A lithium secondary battery according to claim 7, wherein said metallic powder includes metallic silver.

* * * * *